J. C. FATE.
BRIDLE BIT.
APPLICATION FILED JAN. 4, 1911.

994,732.

Patented June 13, 1911.

Witnesses
F. C. Gibson.

Inventor
John C. Fate.
By Victor J. Evans
Attorney

THE NORRIS PETERS CO., WASHINGTON, D. C.

UNITED STATES PATENT OFFICE.

JOHN COX FATE, OF COLLEGEVIEW, NEBRASKA.

BRIDLE-BIT.

994,732.

Specification of Letters Patent. Patented June 13, 1911.

Application filed January 4, 1911. Serial No. 600,707.

*To all whom it may concern:*

Be it known that I, JOHN C. FATE, a citizen of the United States, residing at Collegeview, in the county of Lancaster and State of Nebraska, have invented new and useful Improvements in Bridle-Bits, of which the following is a specification.

This invention relates to improvements in bridle bits and aims to provide a simple, light and efficient construction of great strength and power, so as to control and hold the animal on which it is to be used.

With the above and other objects in view which will appear as the description progresses, the invention resides in the novel construction and arrangement of parts hereinafter more full described and claimed.

Figure 1:
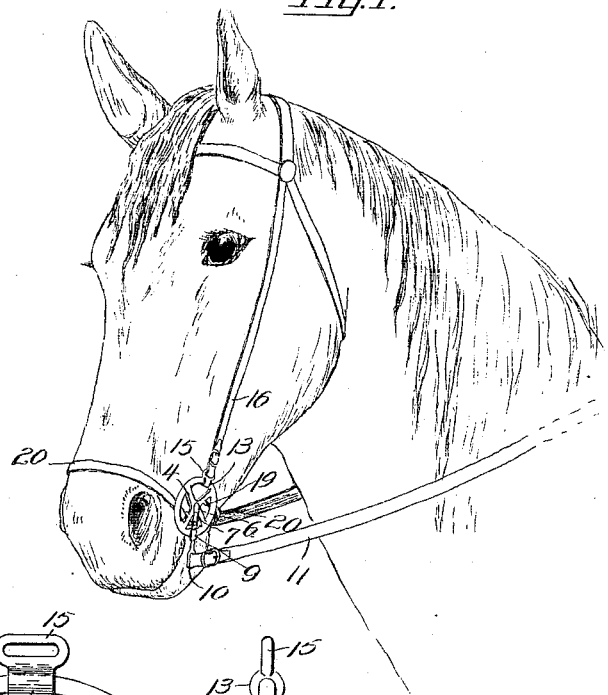
Figure 2:
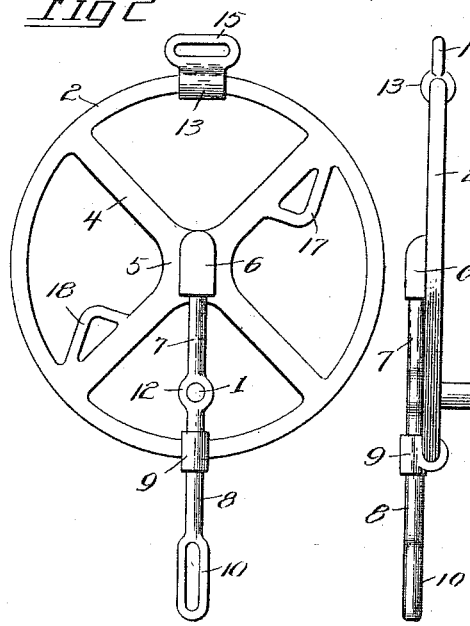
Figure 3:
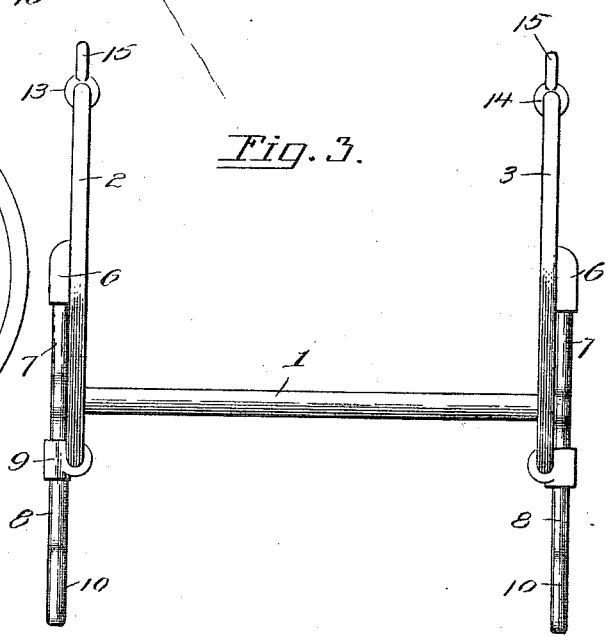

In the accompanying drawings, Figure 1 is a view of the bit in applied position upon an animal. Fig. 2 is a side elevation of the bit. Fig. 3 is a front elevation of the same.

In the accompanying drawings the numeral 1 designates the mouthpiece of the improved bit. The bit is provided adjacent each of its ends with what I term the cheek rings 2 and 3. Each of the rings 2 and 3 have their peripheries preferably of a circular form and the said peripheries are connected with the central portion of each of the rings through the medium of radiating spokes 4. The central portions or hubs 5 of the ring members 2 and 3 are each formed with a socket 6 and each of the said sockets is preferably threaded upon its interior and adapted for the reception of the threaded extension 7 of the rein connecting arm 8. The rings 2 and 3 have their peripheries formed with collars 9 through which the arms 8 project, and the extended portions of the said arms are connected with the sockets 6.

The lower extremities of the arms 8 are formed with eyes 10 and the said eyes are adapted to engage with the ends of the rein 11. The arms 8 are each formed with alining enlargements 12, the same being formed with recesses or pockets, preferably threaded whereby the ends of the mouthpiece 1 are connected with the oppositely disposed rings 2 and 3. It is, of course, to be understood that other methods of connecting the mouth piece to the arms 8 as well as the said arms to the rings 2 and 3 may be employed if desired.

Positioned directly above the sockets 6 and slidably mounted upon the peripheries of the rings 2 and 3 are the sleeves 13 and 14. Each of these sleeves has its upper portion formed with an eye 15, and the said eyes are adapted to engage the side straps 16 of the head stall. The connecting spokes 4 are formed with loops 17 and 18. The loop 17 is positioned adjacent the periphery of each of the rings 2 and 3 above and at an angle to the socket 6 of each of the said rings. This loop is adapted to receive the rearwardly extending curb strap 19 of the head stall or bridle. The loop 18 is positioned at an angle to and at a distance below the socket 6 of each of the rings 2 and 3. The loop 18 is also arranged adjacent the periphery of each of the rings and the said loop is adapted for the reception of one end of the nose strap 20 of the head stall or bridle.

From the above description taken in connection with the accompanying drawings, the simplicity of the device, as well as the method of use will, it is thought, be perfectly apparent to those skilled in the art to which the invention appertains, it being noted that a pull upon the rein arms 8 will cause the bit to travel rearwardly and will also rotate the rings 2 and 3 upon the sleeves 13 and thus cause the throat and nose straps 19 and 20 to tightly contact the mouth of the animal and tend to force the same closed.

Having thus fully described the invention, what I claim as new, is:—

In a device of the class described, a pair of cheek rings, a hub for each of the rings, each of said rings having its hub provided with a socket, a collar upon each of the rings alining with the socket, a rein arm engaging the collar and socket of each of the cheek rings, the periphery of each of the rings being provided above the socket with a sliding sleeve, each of said sleeves being formed with an eye, each of the cheek rings being provided with angularly related oppositely disposed loops, and a mouth piece removably connected with the rein arms, all substantially as and for the purpose set forth.

In testimony whereof I affix my signature in presence of two witnesses.

JOHN COX FATE.

Witnesses:
T. A. LORENZ,
SAM LOOMIS.

Copies of this patent may be obtained for five cents each, by addressing the "Commissioner of Patents, Washington, D. C."